US010073168B2

(12) United States Patent
Hairston et al.

(10) Patent No.: US 10,073,168 B2
(45) Date of Patent: Sep. 11, 2018

(54) FREQUENCY MEASUREMENT FOCAL PLANE ARRAY INPUT CIRCUIT

(71) Applicant: BAE SYSTEMS Information and Electronic Systems Integration Inc., Nashua, NH (US)

(72) Inventors: Allen W Hairston, Andover, MA (US); Gary M Madison, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 446 days.

(21) Appl. No.: 14/813,159

(22) Filed: Jul. 30, 2015

(65) Prior Publication Data
US 2017/0031012 A1    Feb. 2, 2017

(51) Int. Cl.
*G01S 7/497* (2006.01)
*G01S 17/10* (2006.01)
*G01S 17/89* (2006.01)

(52) U.S. Cl.
CPC ............ *G01S 7/497* (2013.01); *G01S 17/105* (2013.01); *G01S 17/89* (2013.01)

(58) Field of Classification Search
CPC ...... G01S 17/89; G01S 7/4813; G01S 7/4816; G01C 3/08
See application file for complete search history.

(56) References Cited

U.S. PATENT DOCUMENTS

| 4,928,152 | A | * | 5/1990 | Gerardin ............... G01S 17/325 356/28.5 |
| 5,159,396 | A | | 10/1992 | Yuhas |
| 5,448,161 | A | * | 9/1995 | Byerley, III ............ G01J 1/44 324/72 |
| 5,461,235 | A | | 10/1995 | Cottrell et al. |
| 8,426,797 | B2 | | 4/2013 | Aull et al. |
| 8,829,452 | B1 | | 9/2014 | Brown |
| 2003/0010128 | A1 | | 1/2003 | Buell et al. |
| 2005/0088644 | A1 | | 4/2005 | Morcom |
| 2006/0197938 | A1 | | 9/2006 | Halmos et al. |
| 2006/0267054 | A1 | | 11/2006 | Martin et al. |
| 2010/0226495 | A1 | | 9/2010 | Kelly et al. |
| 2013/0242283 | A1 | * | 9/2013 | Bailey ..................... G01S 17/89 356/4.01 |
| 2014/0340487 | A1 | | 11/2014 | Gilliland et al. |

FOREIGN PATENT DOCUMENTS

WO  PCT/US2016/041971      7/2016

* cited by examiner

*Primary Examiner* — Luke D Ratcliffe
(74) *Attorney, Agent, or Firm* — Maine, Cernota & Rardin; Scott J. Asmus

(57) ABSTRACT

The invention measures the frequency of a heterodyne laser radar (LADAR) system signal in the input cell of a focal plane array (FPA). Embodiments amplify the return signal, and drive it into a counter for a fixed period of time. The frequency is the number of counts divided by the count time. An example design amplifier amplifies the return of a single photon response of an avalanche photodiode with a gain of 100 into a digital signal level at a 200 MHz rate with only 84 µW, demonstrating the feasibility of the approach.

10 Claims, 6 Drawing Sheets

LADAR SYSTEM ENVIRONMENT

LADAR SYSTEM ENVIRONMENT

LADAR BLOCK DIAGRAM

FM ROIC SCHEMATIC

TRANSIENT ANALYSIS

METHODS OF OPERATION

OPERATION FLOW CHART

FREQUENCY MEASUREMENT FOCAL PLANE ARRAY INPUT CIRCUIT

FIELD OF THE INVENTION

The invention relates to a circuit and method for measuring the frequency of a heterodyne laser radar (LADAR) system signal in the input cell of a focal plane array (FPA).

BACKGROUND OF THE INVENTION

LAser raDAR (LADAR) combines laser-focused imaging with radar's ability to calculate distances by measuring the time for a signal to return. Such sensors are used for detection, identification, and precision measurement of the range to a target. Data generated by the sensor can be used for targeting, command, and control computers of automated and semi-automated systems. The data can be used for precision short and long-range target detection, identification, and ranging measurements for command, control, and navigation systems of autonomous, semi-autonomous, and remotely operated manned and unmanned vehicles. In operation, light reflected by backscattering is received at the detector. LADAR detection can be by direct energy detection (amplitude measurement) or by coherent detection. Coherent systems generally use optical heterodyne detection, which, being more sensitive than direct detection, allows them to operate at a much lower power but at the expense of more complex transceiver requirements. LADAR systems can employ two types of pulse models: micropulse and high energy. Micropulse systems use considerably less laser energy, typically on the order of one microjoule. Common wavelengths range from 10 microns to 250 nm (UV).

SUMMARY OF THE INVENTION

An embodiment provides a device for measuring a frequency of a heterodyne laser radar (LADAR) system signal in an input cell of a focal plane array (FPA) comprising a detector; an AC coupled amplifier input; a counter; and a latch outputting a read out. In embodiments the counter and the latch comprise 14 to 16 bits. In other embodiments, the detector is an avalanche photodiode (APD). In subsequent embodiments the AC coupled amplifier input comprises gain and bandwidth adjustment. For additional embodiments the gain is about 500 and bandwidth from about 25 to 200 MHz. In another embodiment, the APD is a HgCdTe detector. A following embodiment further comprises a LADAR range detector measuring a time of arrival of a return pulse using an external reference clock as a counter clock, and storing a counter value corresponding to the time of arrival of the return LADAR pulse. Subsequent embodiments further comprise a photon counting focal plane array, where the gain of the APD and amplifier is large enough for individual photons to generate a signal large enough to operate the counter. Additional embodiments further comprise a narrow laser cold filter.

Another embodiment provides a method for measuring a frequency (FM) of a heterodyne laser radar (LADAR) system signal in an input cell of a focal plane array (FPA) comprising providing a LADAR FM FPA circuit; counting a beat frequency, whereby detection and frequency measurement are accomplished; counting photons during a period, whereby photons are passively counted; and clocking start or stop times of counter, whereby ranging is directly detected. In included embodiments a fixed counting period is an entire frame. In yet further embodiments a fixed counting period is less than a frame. In related embodiments a fixed counting period is more than a frame. Further embodiments comprise a range gate. In ensuing embodiments pulses are longer than two times a frame rate. For yet further embodiments, a minimum of count periods is chosen as a count period with least noise counts. For more embodiments, passive and active counting are simultaneously accomplished. Continued embodiments include a faster frame rate is employed for shorter pulses. For additional embodiments, the system has single photon sensitivity, wherein the LADAR FM FPA circuit comprises an avalanche photodiode (APD) having a gain of about 100 into a digital signal level at a 200 MHz rate with 84 µW.

A yet further embodiment provides a system for measuring a frequency (FM) of a heterodyne laser radar (LADAR) system signal in an input cell of a focal plane array (FPA) comprising an avalanche photodiode (APD); an AC coupled amplifier comprising gain and bandwidth adjustment input; a counter; a latch outputting a read out; counting a beat frequency, whereby detection and frequency measurement are accomplished; counting photons during a period, whereby photons are passively counted; and clocking start or stop times of counter, whereby ranging is directly detected, wherein the FPA dimensions are 256 by 256, pixel dimensions are about 30 µm, and an avalanche photo diode gain is about 100, adjustable per-pixel.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The invention measures the frequency of a heterodyne laser radar (LADAR) system signal in the input cell of a focal plane array (FPA). Embodiments amplify the return signal, and drive it into a counter for a fixed period of time. The frequency is the number of counts divided by the count time. An amplifier is designed to amplify the return of a single photon response of an avalanche photodiode with a gain of 100 into a digital signal level at a 200 MHz rate with only 84 µW.

Figure 1:
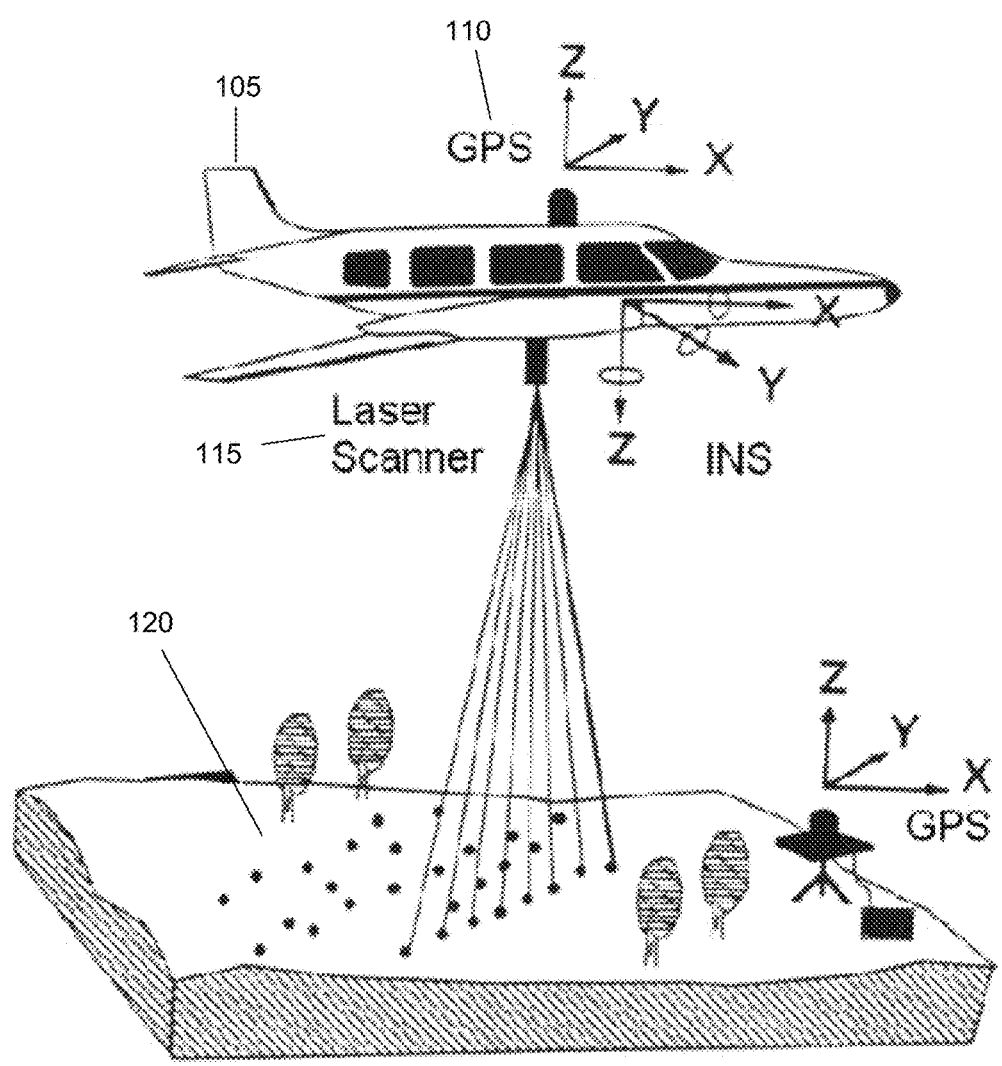
FIG. 1 is a depiction of a LADAR system environment configured in accordance with one embodiment of the invention.

FIG. 1 depicts a LADAR system environment 100. Platform 105 (not necessarily airborne) incorporates GPS locating information 110, and supports laser scanner system 115 to scan target area 120.

Figure 2:
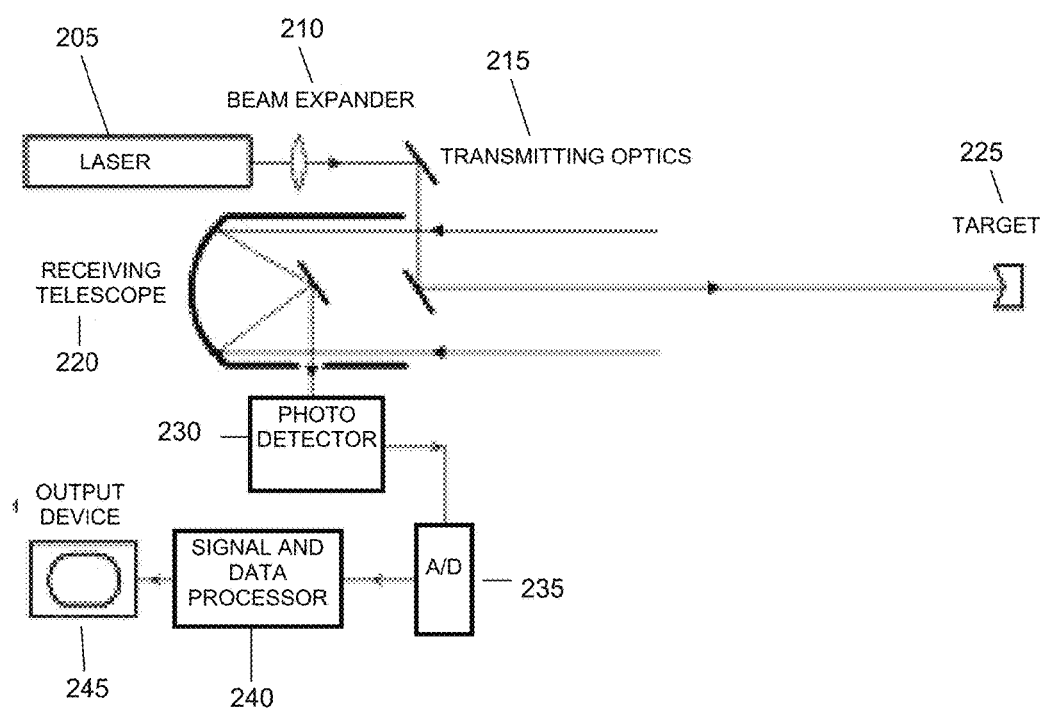
FIG. 2 is a LADAR system block diagram configured in accordance with one embodiment of the invention.

FIG. 2 is a LADAR system block diagram 200. Components comprise laser 205; beam expander 210; transmitting optics 215; receiving telescope 220; target 225; photodetector 230; A/D converter 235; signal and data processor 240; and output device 245.

Embodiments of the invention support focal plane arrays with formats up to 256×256. This FPA architecture can also support alternate FPA operating modes, allowing it to do direct detect ranging LADAR or passive photon counting. The circuit can also count photons for very low flux applications or perform direct detect ranging by counting reference clock cycles until return pulse is detected.

Figure 3:
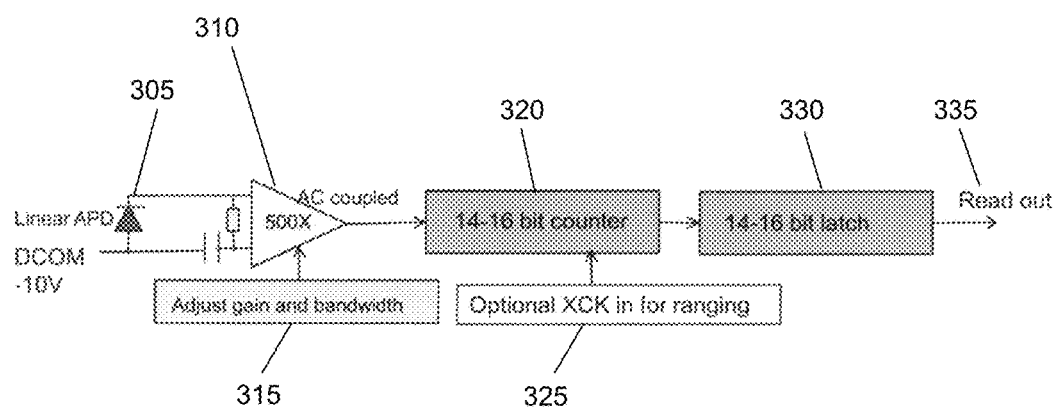
FIG. 3 is a frequency measurement (FM) focal plane array (FPA) input circuit block diagram configured in accordance with one embodiment of the invention.

FIG. 3 depicts a frequency measurement focal plane array input circuit 300 for heterodyne LADAR Systems. Elements include linear avalanche photodiode (APD) 305 with DCOM −10V input; 500× AC coupled amplifier 310; gain and bandwidth adjustment input 315; 14-16 bit counter 320; optional XCK in for ranging 325; 14-16 bit latch 330; and read out 335. LADAR Frequency Measurement FPA embodiments count fast pulses for multiple functions. They measure heterodyne LADAR presence and frequency by counting cycles in a known period. The frequency is equal to the number of counts per count period, assuming the signal is present for the entire count period. Embodiments count passively generated photons for low flux levels. In embodiments, this may require detectors operating at T<80K. When there is sufficient gain to count photons, pulse counting functionality is no different for FPAs. Direct range detection can be performed by counting external reference clock cycles for the return time.

For additional functionality, detection starts or stops the count of an externally supplied reference clock. For embodiments, the counter has 14 to 16 bits. A 10 KHz frame rate is employed with all digital input and output for embodiments. Embodiments use HgCdTe linear avalanche photo diode (APO) detectors, nominally at 80K operation. They also have input fuse high voltage protection on the read out integrated circuit (ROIC) for shorted detectors. Embodiments are fabricated in 130 nm CMOS processes. The high speed amplifier has programmable gain and bandwidth control. This gain is high enough to count individual photons at 200 MHz ($G_{APD}$=100), and gain control is programmable by pixel. Using nonlinear gain allows the counting of very large signals at high gain with no saturation. Array sizes up to 256×256 can operate at less than 6 W of power; existing cryo coolers are adequate for 6 W of cooling. In embodiments, pixel size is nominally 30 μm.

LADAR FM FPA embodiments provide four functions: detection, frequency measurement, photon counting, and direct range detection.

Detection and Frequency Measurement

Detection and frequency measurement functions for heterodyne LADAR systems count the beat frequency cycles per fixed period to measure the frequency and indicate detection. A fixed period is nominally an entire frame, but could also employ multiple and/or shorter periods, with a faster frame rate for shorter pulses. A fixed period could be less than a frame time with a range gate. Multiple period/frame capability comprises a register and digital comparator, with >2× logic. For pulses shorter than the frame time, the maximum of count periods is chosen, where the count period is <=pulse/2. For pulses longer than twice the frame time, the minimum of count periods is chosen as the count period with the least noise dark counts. For cases where noise dark counts are with photon counts, the higher output will indicate detection of the signal and the frequency is recovered with signal processing.

Passive Photon Counting

For passive photon counting, if the APD FPA has single photon sensitivity (gain>threshold), then it can also count photons (and dark electrons) for very high sensitivity passive applications. However, this is only accurate if the probability of "simultaneous" photons is low. If the dark count rate is low, then passive and active functions can be accomplished at the same time (a small number of counts are passive photons plus noise, and high number of counts are active frequency measurements). A narrow laser cold filter would let few passive photons through, but sufficient for operation.

Direct Detect Ranging

For direct detect ranging, if the counter is supplied with an external reference clock and some simple logic, this input circuit can also do direct detect LADAR ranging with a digital output. Embodiments stop or start the count using an external reference clock on detection of a pulse. "Start" minimizes counting during detection. A read out reference counter starts at the beginning of the range gate, and stops with the all the other counters for delay calculation. In embodiments, there are a few test pixels in the corners of the FPA.

Figure 4:
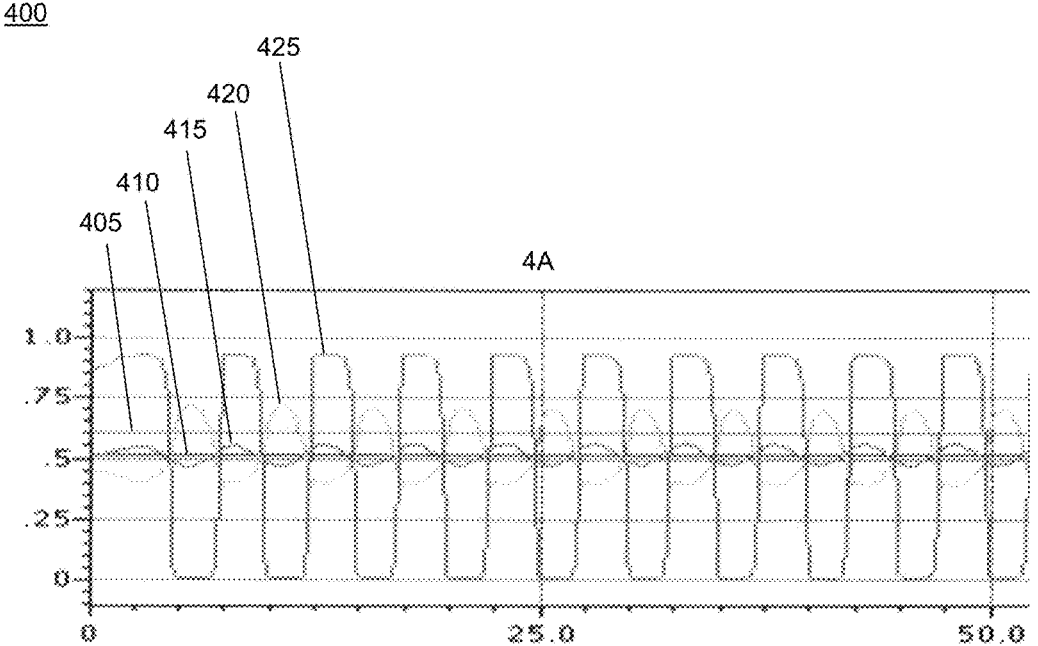
FIG. 4 is a transient analysis graph configured in accordance with one embodiment of the invention.
Figure 4:
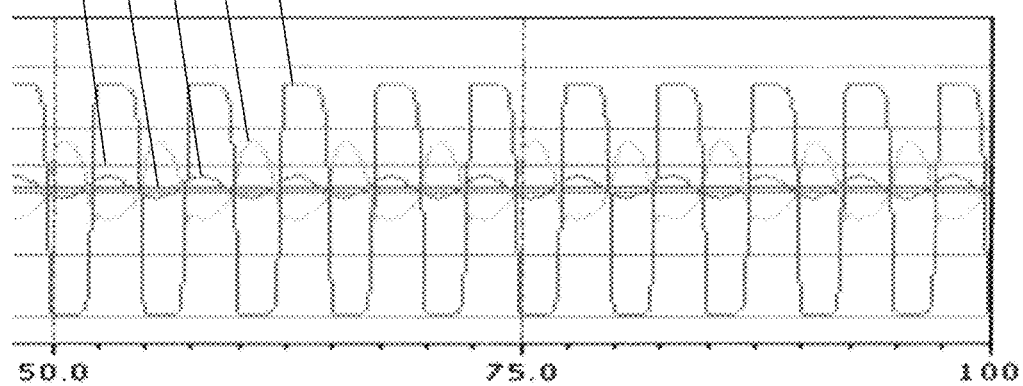

FIG. 4 is a transient analysis graph 400 demonstrating the feasibility of reasonable performance with circuits that could fit in an FPA. 4A depicts 0 to 50 ns, and 4B depicts 50-100 ns. The five traces are: out0 405; out1 410; out2 415; out3 420; and O_P 425. High Speed Detection in FPA pixels provides full scale output with input equivalent to single photons into the APD at 200 MHz. FIG. 4 depicts this transient analysis for a $C_{inp}$ of approximately 50 fF, f=200 MHz, and 100 electrons. Embodiments include 84 μW pixel power that is compatible with FPA sizes up to 256×256 with 6 W total FPA power. Gain is greater than 500, and the bandwidth is from 25 to 200 MHz. Gain and bandwidth are selectable with bias and control signal changes. Pixel level programming controls the overall threshold and compensates for non-uniformity. In embodiments, the overall pixel circuit fits within a 30 μm pixel.

Figure 5:
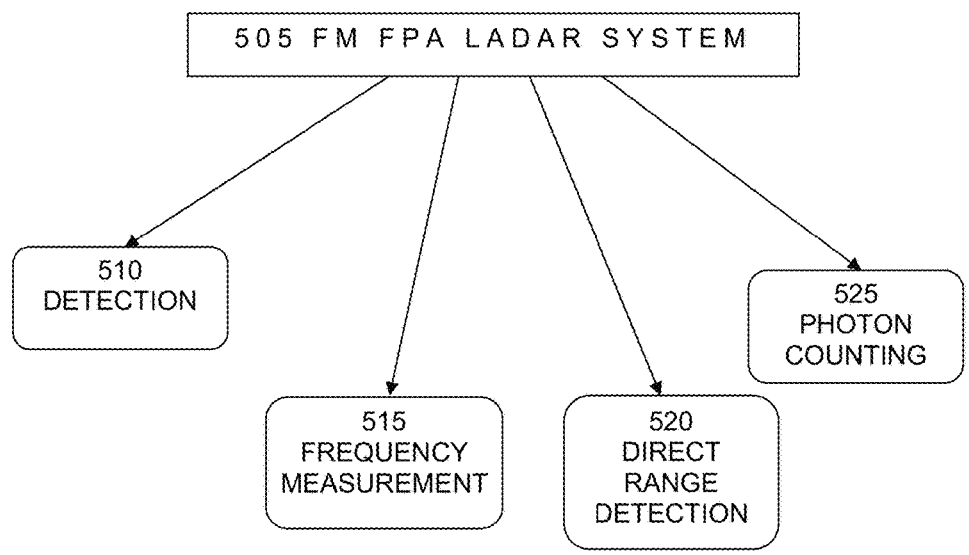
FIG. 5 is a methods of operation diagram configured in accordance with one embodiment of the invention.

FIG. 5 is a methods of operation diagram 500. FM FPA LADAR systems 505 have four functions comprising detection 510; frequency measurement 515; direct range detection 520; and photon counting 525.

Figure 6:
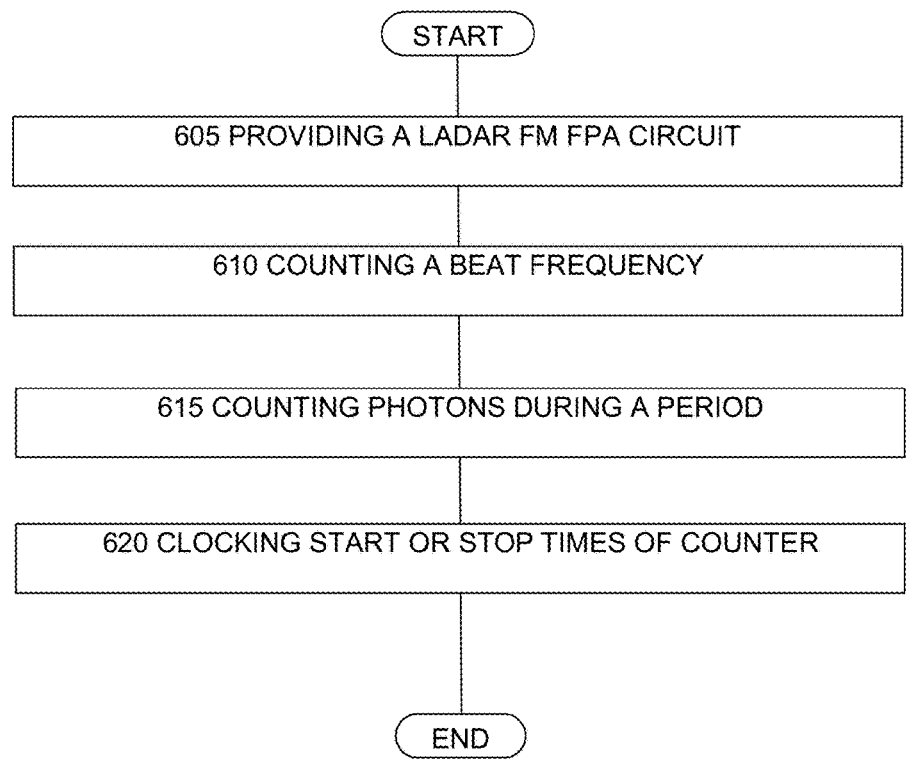
FIG. 6 is an operation flow chart configured in accordance with one embodiment of the invention.

FIG. 6 is an operation flow chart 600. Embodiments comprise the steps of providing a LADAR FM FPA circuit 605; counting a beat frequency, whereby detection and frequency measurement are accomplished 610; counting photons during a period, whereby photons are passively counted 615; and clocking start or stop times of counter, whereby ranging is directly detected 620. Steps can be performed in alternate orders.

The foregoing description of the embodiments of the invention has been presented for the purposes of illustration and description. It is not intended to be exhaustive or to limit the invention to the precise form disclosed. Many modifications and variations are possible in light of this disclosure it is to be understood that other similar embodiments may be used or modifications or additions may be made to the described embodiment for performing the same function of the present invention without deviating therefrom. It is intended that the scope of the invention be limited not by this detailed description, but rather by the claims appended hereto.

What is claimed is:

1. A device for measuring a frequency of a heterodyne laser radar (LADAR) system signal in an input cell of a focal plane array (FPA) comprising:

a detector;

an AC coupled amplifier having an AC coupled amplifier input, output of said detector coupled to a detector input of said AC coupled amplifier input of said AC coupled amplifier;

a counter having a counter input and a counter output, said counter input directly coupled to an output of said AC coupled amplifier; and a latch, having an input, said latch input directly coupled to said output of said counter, said latch outputting a read out, whereby said frequency of said heterodyne LADAR system is measured.

2. The device of claim 1, wherein said counter and said latch comprise 14 to 16 bits.

3. The device of claim 1, wherein said detector is an avalanche photodiode (APD).

4. The device of claim 1, wherein said AC coupled amplifier input comprises gain and bandwidth adjustment.

5. The device of claim 4, wherein said gain is about 500 and bandwidth from about 25 to 200 MHz.

6. The device of claim 3, wherein said APD is a HgCdTe detector.

7. The device of claim 1, further comprising a LADAR range detector measuring a time of arrival of a return pulse using an external reference clock as a counter clock, and storing a counter value corresponding to said time of arrival of said return LADAR pulse.

8. The device of claim 3, further comprising a photon counting focal plane array, wherein a gain of said APD and amplifier is large enough for individual photons to generate a signal large enough to operate said counter.

9. The device of claim 1, further comprising a narrow laser cold filter.

10. A system for measuring a frequency (FM) of a heterodyne laser radar (LADAR) system signal in an input cell of a focal plane array (FPA) comprising:

a detector, wherein said detector is an avalanche photodiode (APD), configured to count photons during a period;

an AC coupled amplifier comprising gain and bandwidth adjustment input;

said AC coupled amplifier having an AC coupled amplifier detector input, wherein an output of said detector is coupled to said detector input of said AC coupled amplifier;

a counter configured to count a beat frequency, whereby detection and frequency measurement are accomplished;

said counter having a counter input and a counter output, said counter input directly coupled to an output of said AC coupled amplifier;

a latch, having a latch input and a latch output, said latch input directly coupled to said counter output of said counter, said latch outputting a read out; and an external reference clock configured to clock start or stop times of the counter, whereby ranging is directly detected and said frequency of said heterodyne LADAR system is measured, wherein said FPA dimensions are 256 by 256, pixel dimensions are about 30 μm, and an avalanche photodiode gain is about 100, adjustable per-pixel.

\* \* \* \* \*